Sept. 12, 1944. H. V. SCHWEITZER 2,358,258
UNIVERSAL CERAMIC MACHINE
Filed June 7, 1940 8 Sheets-Sheet 2

FIG.-2

INVENTOR
HOWARD V. SCHWEITZER
by Ely & Frye
ATTORNEYS

Sept. 12, 1944.                H. V. SCHWEITZER                2,358,258
                           UNIVERSAL CERAMIC MACHINE
                              Filed June 7, 1940           8 Sheets-Sheet 4

INVENTOR
HOWARD V. SCHWEITZER
BY
Ely & Frye
ATTORNEYS

Sept. 12, 1944.  H. V. SCHWEITZER  2,358,258
UNIVERSAL CERAMIC MACHINE
Filed June 7, 1940  8 Sheets-Sheet 5

INVENTOR
HOWARD V. SCHWEITZER
BY
Ely & Frye
ATTORNEYS

Sept. 12, 1944.        H. V. SCHWEITZER           2,358,258
                  UNIVERSAL CERAMIC MACHINE
                     Filed June 7, 1940      8 Sheets-Sheet 7

INVENTOR
HOWARD V. SCHWEITZER

BY Ely + Frye

ATTORNEYS

Sept. 12, 1944.  H. V. SCHWEITZER  2,358,258
UNIVERSAL CERAMIC MACHINE
Filed June 7, 1940  8 Sheets-Sheet 8

INVENTOR
HOWARD V. SCHWEITZER
BY Ely & Frye
ATTORNEYS

Patented Sept. 12, 1944

2,358,258

UNITED STATES PATENT OFFICE 2,358,258

UNIVERSAL CERAMIC MACHINE

Howard V. Schweitzer, Shaker Heights, Ohio

Application June 7, 1940, Serial No. 339,400

21 Claims. (Cl. 91—12)

This invention relates to a ceramic machine, and, more particularly, to an automatic machine which is adapted to perform any one of several operations in the treatment and decoration of ceramic ware. Specifically, by employing a machine made according to this invention, ceramic ware may be banded, glazed, sand blasted, or stamped. Heretofore, some of the operations, such as banding and stamping, have been performed only by hand or by manually operated devices. Other operations, such as glazing and sand blasting, have been performed by automatic machinery, but it has not been practical, heretofore, to use a glazing machine for sand blasting, or vice versa.

A machine made according to this invention comprises, in general, a large revolving table carrying a plurality of rotatable spindles which carry the ceramic ware to be treated. Supported in alignment with each spindle is a counter-spindle which, except in the glazing operation, carries a member which engages the ware being treated. The ware, except in the stamping operation, is treated by means of spray guns mounted on an oscillating carriage which moves in synchronism with the revolving table during the phase of oscillation in which the carriage moves in the direction of revolution of the table. The spray guns carried by the table are directed toward the ware and are operated only when the table and carriage move in synchronism.

It is an object of this invention, therefore, to provide a universal ceramic machine which employs a counter-spindle to engage the ware during treatment. Another object of this invention is to provide a counter-spindle which will not slid upon or smear ware while the counter-spindle engages the ware. It is also an object of this invention to provide a ceramic machine embodying means to move a counter-spindle in and out of engagement with the ware.

It is a further object of this machine to provide a gun carriage drive for a ceramic machine or like machines which will permit the gun carriage to be driven in synchronism with the articles to be treated without jarring or vibrating the table carrying the articles. It is a still further object of this invention to provide an improved means for controlling the timed operation of said gun carriage and the spray guns carried thereby.

Other objects and advantages of this invention will appear from the following specification, claims, and drawings, in which:

In the drawings, in which like reference characters refer to like parts, 10 represents a suitable structural steel framework for the machine. A vertical post 11, mounted on cross-beams 12 of the framework 10, carries suitable radial thrust bearings 13 on which the hub 14 of the table 15 revolves. The table 15 comprises a rim 16 carried by suitable spokes 17 on the hub 14. An annular apron 18 is supported by the rim 16. Depending from the spokes 17 is a large sprocket 19 by which the table 15 is driven.

The table drive 20 comprises a variable speed reducer 21 driven by a motor 22. The speed reducer 21 carries a driving sprocket 23 which drives the sprocket 19 by means of a chain 24. A suitably mounted idler sprocket (not shown) may be employed to take up slack in the chain 24. In the drawings the table 15 is shown revolving in a counter-clockwise direction. The speed of revolution of the table 15 may, of course, be regulated and varied by means of the speed reducer 21.

A plurality of spindles 25 equally spaced about the periphery of the table 15 are mounted on the rim 16. As shown in Figs. 2, 3, 8, 9, and 14, each spindle 25 comprises a tubular spindle housing 26 fixed to the apron 18 and extending through the rim 16. Each of the spindle housings 26 carry at the ends thereof the bushings 27 in which a spindle shaft 28 is journalled. A V-belt pulley 29 is secured to the lower portion of the spindle shaft 28 below the rim 16. The upper end of the shaft 28 which extends above the spindle housing 26 is adapted to receive a suitable ware holder to be described in detail in connection with the several modifications of this invention.

A tubular counter-spindle housing 30 is supported above and in axial alignment with each spindle 25 by suitable means to be described in detail in connection with the several modifications of this invention. Removably secured in the counter-spindle housing 30 is the counter-spindle bearing 31 which is provided with an enlarged central bore 32 and a lower collar 33 and an upper collar 34. The bore 35 of the lower collar 33 is provided with an upwardly divergent taper 36 and the bore 37 of the upper collar 34 is likewise provided with an upwardly divergent taper 38. The tapers 36 and 38 serve to center the floating counter-spindle shaft 40. A removable cap 39 closes the upper end of the counter-spindle housing 30.

The counter-spindle shaft 40 extends below the bearing 31 and housing 30 and, in its disengaged position (see Fig. 14), is maintained within the housing 30 by an integral flange 41 which engages the upper collar 34. The lower end of the counter-spindle shaft 40 is provided with an enlarged cylindrical foot 42 to which may be attached suitable ware engaging members, to be described in detail in connection with the several modifications of this invention. When the counter-spindle shaft 40 is in its disengaged position, an enlarged lower journal 43 is received in the bore 35 of the collar 33 and an enlarged upper journal 44 is received in the bore 37 of the collar 34. Both the journals 43 and 44 are provided with tapers 45 and 46, respectively, adapted to mate with the centering tapers 36 and 38, respectively, when the counter-spindle shaft 40 is dropped from its engaged position (see Figs. 3 and 9) to its disengaged position (see Fig. 14).

A table, table drive, spindles, and counter-spindles constructed according to the foregoing description are preferably employed in all of the operations for which a machine made according to this invention is adapted, except, of course, for glazing operations, in which the counter-spindle may be conveniently omitted. If the machine is intended primarily for use as a banding machine, a preferred form of spindle actuating means and counter-spindle support is as follows:

*Preferred counter-spindle support and spindle elevating means for banding operations*

Figure 1:
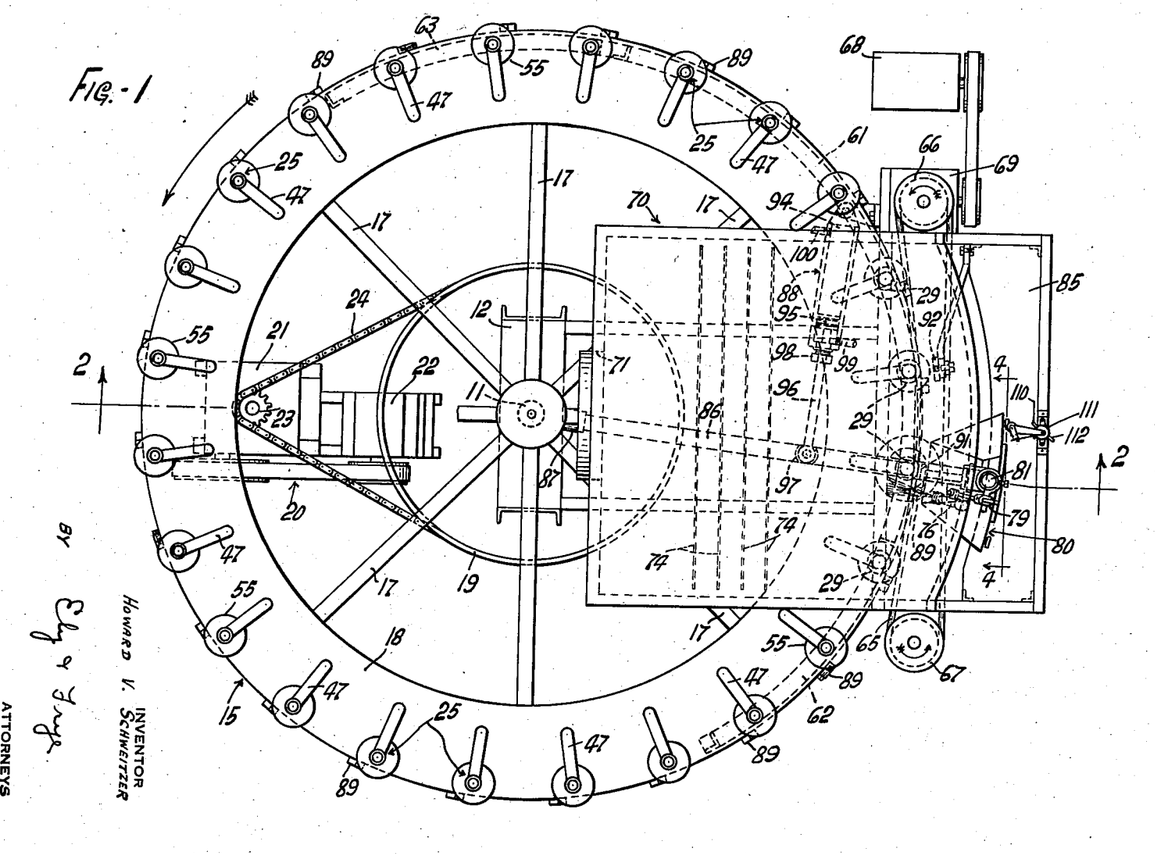
Fig. 1 is a plan view illustrating a preferred form of this invention set up to perform a banding operation on ceramic ware.
Figure 2:
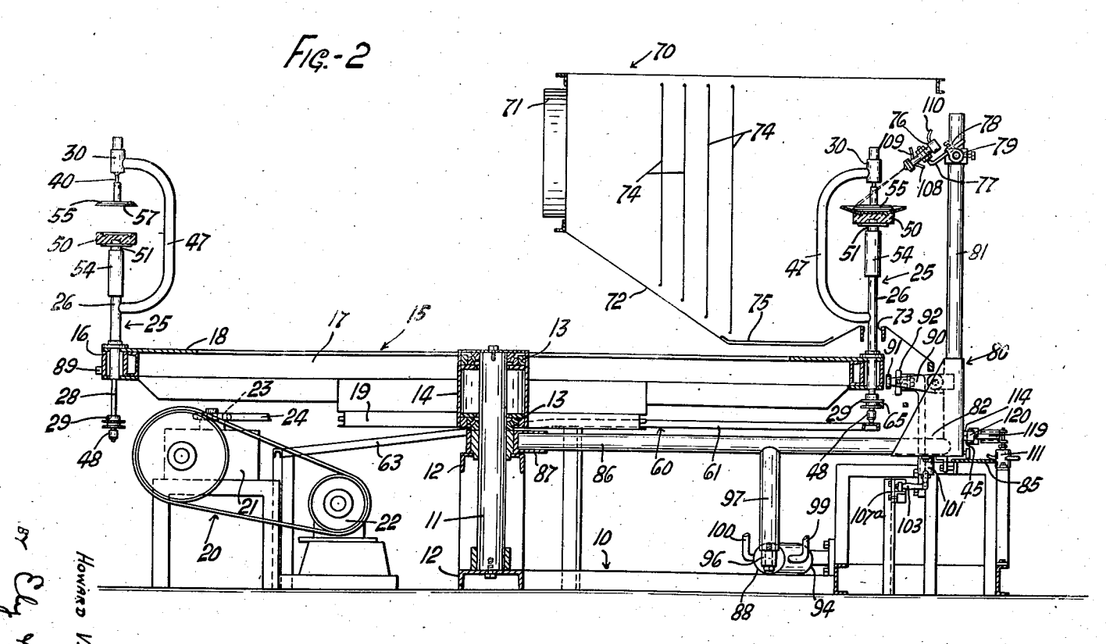
Fig. 2 is a diametrical section taken along the line 2—2 of Fig. 1.
Figure 3:
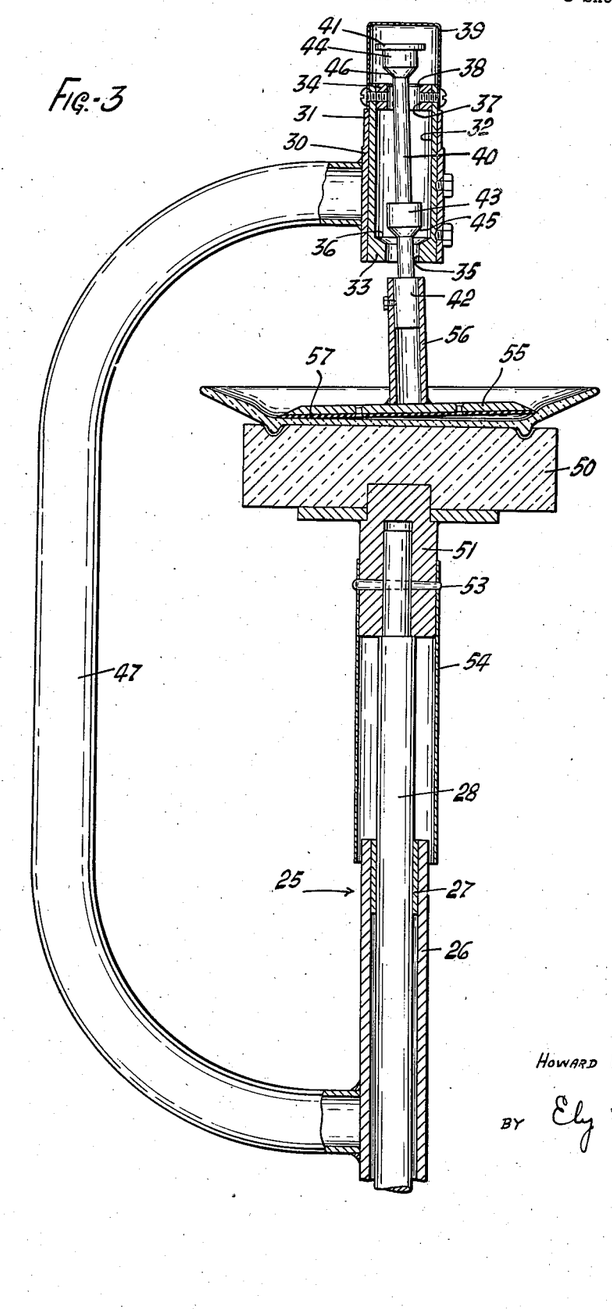
Fig. 3 is an enlarged fragmentary detail elevation, partly in section, of the spindle shown in Fig. 2.

In the embodiment shown in Figs. 1 to 7, which show a universal ceramic treating machine made according to this invention set up for banding operations, each counter-spindle housing 30 is supported in axial alignment with each spindle housing 26 by an arcuate counter-spindle support 47, the ends of which may be welded or otherwise secured to the spindle housing 26 and counter-spindle housing 30. The counter-spindle supports are preferably located radially with respect to the table apron 18. When ware is banded, a band of colored glaze, or the like, is applied to the rim of a piece of ware supported on a spindle 25. The ware supporting means, as shown in Fig. 3, comprises a form 50 suitably grooved to receive the foot of a piece of ware and thus support a piece of ware substantially concentrically on the spindle 25. The form 50 is secured to a hub 51 which is removably secured to the upper end of the spindle shaft 28 by means of the cotter pin 53. A sleeve 54 adapted to protect the portion of the spindle shaft 28 which may extend above the housing 26 is carried by the pin 53. A banding mask 55 adapted to engage the center of a piece of ware is removably secured to the foot 42 of the counter-spindle by means of a set screw in the mask socket 56 which is centrally located on the mask 55. The mask 55 is provided with a facing 57, usually of rubber, which actually contacts the ware.

As shown in Figs. 2 and 3, the spindle shafts 28 are adapted to be moved axially as well as to be rotated within the spindle housing 26, downward axial movement of the spindle shaft being limited by the hub 51. To secure the elevation of the spindle shaft 28, a cam follower 48, comprising a ball bearing retained in a cage secured to the lower end of the shaft 28, engages a cam track 60.

The cam track 60 comprises a fixed arcuate member suitably supported below the rim 16. The central portion 61 of the cam track 60 is horizontal and elevated above the level of the lower ends of the spindle shafts 28 when said shafts are in their lowermost position, as shown at the left of Fig. 2. The forward portion 62 and end portion 63 of the cam track 60, however, are sloped to a level below the lowermost position of the shafts 28.

*Operation of the spindle elevating means*

As the table 15 is revolved in a counter-clockwise direction, as shown in Fig. 1, the cam follower 48 engages the forward portion 62 of the cam track 60. As the table 15 continues to revolve, the follower 48 rides up the sloping portion 62 until the horizontal portion 61 is reached, at which time the spindle shaft 28 is in its uppermost position, as shown at the right of Fig. 2 and in Fig. 3. As shown at the left of Fig. 2, the counter-spindle 40 is in its disengaged position and the mask 55 is spaced from the ware support 50, so that ware may be placed thereupon. As the spindle shaft 28 is elevated by the action of the cam track 60 as the table revolves, ware carried by the support 50 engages the mask 55, and, as the cam follower 48 rides up the sloping forward portion 62 onto the horizontal portion 61 of the cam track, the enlarged journals 43 and 44 are lifted out of the bores 35 and 37 of the collars 33 and 34. Therefore, when the counter-spindle 40 is in its disengaged position, as shown in Figs. 2 and 3, the mask 55 rests upon the ware carried by the form 50 and the counter-spindle 40 floats within the enlarged bore 32 of the bearing 31 free of the collars 33 and 34.

The mask 55 and counter-spindle 40 continue to float upon the ware carried by the shaft 28 so long as the cam follower 48 rides on the horizontal portion 61 of the cam track. As the cam follower 48 rides down the sloping end portion 63, however, the ware is withdrawn from the mask 55 as the shaft 28 is lowered until it returns to its lowermost position as the cam follower leaves the end portion 63. The spindle 40 is then returned to its disengaged position and the ware may be removed from the form 50. As the counter-spindle 40 is returned to its disengaged position, the tapers 45 and 46 of the journals 43 and 44 engage the tapers 36 and 38 of the collars 33 and 34, thus centering the journals 43 and 44 in the bores 35 and 36 of the bearing collars.

*Spindle rotating means and operation*

As the spindle shafts 28 are maintained in their elevated position by the portion 61 of the cam track, the spindle shafts are rotated by a V-belt 65 which engages the pulleys 29 carried by the shafts 28. The V-belt 65 is preferably supported by a drive sheave 66 and an idler sheave 67 located so that the pitch line between the sheaves describes a chord across the orbit of the pulleys 29 and across an arc of the horizontal portion 61 adjacent the forward sloping portion 62 of the cam track 60. The drive sheave 66 is driven by a motor 68 through a variable speed reducer 69. By varying the direction and speed of travel of the V-belt 65 by means of the variable speed reducer 69, the speed and direction of rotation of the spindle shaft 28 may be varied independently of the speed of revolution of the table 15.

From the foregoing it is apparent that the motion imparted to ware by the spindles 25 is as follows: After ware is on the form 50, it is elevated until it contacts the mask 55 and disengages the counter-spindle 40. When the mask and counter-spindle are thus supported solely by the ware, the ware is rotated at a high rate of speed by the V-belt 65. The counter-spindle 40 thus floats freely in the bearing 31, and the mask 55 will not be vibrated on the surface of the ware even though the ware may be warped excessively, as shown in Fig. 3. After the pulleys 29 are carried past the V-belt 65, the ware is preferably maintained in contact with the mask 55 until the rotation of the spindle shaft 28 ceases. Then the ware is lowered from contact with the mask 55 by the portion 63 of the cam track. The ware is then removed from the form 50.

*Booth construction*

The ware is banded while it is rotated in contact with the mask 55. The colored banding glaze is applied by means of sprays operated within a booth 70 located over the portion of the table where the spindle shafts 28 are rotated by the V-belt 65. By means of a suitable exhaust system (not shown), air is drawn through the booth from the open front to exhaust outlet 71 in the rear of the booth. The sides of the booth are closed except for suitable openings (not shown) to allow the spindles to be revolved through the booth. The floor 72 of the booth, which slopes forwardly from the exhaust outlet 71, is also provided with an arcuate slot 73 through which the spindles travel. A plurality of baffle plates 74 extend across the booth so that glaze or other sprayed material entrained in the exhaust air will be removed therefrom and directed toward the floor 73 where it will be collected in the removable pans 75.

*Gun carriage*

The spray gun 76, by which the banding glaze is sprayed upon the ware, is pivotally mounted on an angular rod 77 which is slidably secured in a collar 78 fastened to a horizontal arm 79 carried by the vertical gun post 81 of the gun carriage 80. This supporting structure for the spray gun 76 permits the spray gun to be universally adjusted with respect to the gun post 81 and also with respect to the ware carried by each spindle 25 during the period the gun carriage 80 is oscillated in alignment with each spindle 25 as the spindles are revolved through the booth 70.

The gun carriage 80, as shown in Figs. 1 and 2, is comprised of a substantially trapezoidal base 82 upon which the post 81 is mounted and upon which the arcuate gun valve cam plate 83 is also mounted. The carriage 80 is supported by suitable rollers 84 which engage the fixed carriage track plate 85 mounted on the frame 10 and by a radius arm 86 pivotally mounted on a bearing 87 carried by the vertical table post 11. Thus, the carriage 80 oscillates through an arc concentric with the orbit of revolution of the table 15.

The gun carriage is driven by the table 15 and an air cylinder 88. Mounted on the rim 16 adjacent each of the spindles 25 are a plurality of adjustable dogs 89. As the table is revolved through the booth 70, each dog 89 engages the trigger wheel 91 of an upwardly pivotable trigger 90 carried by the carriage 80, the dogs 89 each being located with respect to their adjacent spindles so that when the dogs 89 and trigger 90 are engaged, the post 81 is aligned with a spindle 25, and as the table 15 revolves the gun carriage 80 is carried forwardly in synchronism with it. The trigger 90 is designed so that it is pivotable upwardly, but not downwardly, and the dogs 89 are located on the rim 16 so that each dog 89 will contact the trigger wheel 91 above the center of the wheel. Since the engagement between the dogs 89 and trigger wheel 91 tends to force the trigger 90 downwardly, a positive drive of the gun carriage 80 through the dogs 89 and trigger 90 is obtained. Since the angle of oscillation of the gun carriage should be less than the angle between adjacent spindles, a stop or limit for the forward movement of the gun carriage is provided by the trigger trip cam 92 which is adjustably mounted on an arm 93 carried by the frame 10. As the gun carriage 80 is driven forwardly by the table 15, the trigger 90 engages the trigger trip cam 92 and is lifted upwardly thereby. As soon as the trigger wheel 91 is lifted sufficiently to raise the center of the wheel above the point of contact between the wheel and the dog 89, further tripping action is obtained by the lifting action of the dog 89 on the wheel 91 as well as by the lifting action of the trigger trip cam 92. Thus positive but smooth release of the carriage 80 from the table 15 is obtained so that there is no sudden change in the load on the table which would cause vibrations to be set up in the spindles 25 or in the spray gun 76.

The load of the carriage 80 upon the table 15 is reduced to a mere guiding load and the return of the carriage to its starting position is obtained by the operation of the pneumatic carriage cylinder 88, the head 94 of which is pivotally mounted on the frame 10. A double plunger piston 95 is reciprocated within the cylinder 88 and is connected to the radius arm 86 by means of a piston rod 96 pivotally mounted on a depending member 97 which is integral with the radius arm 86. The end 98 of the cylinder 88 through which the piston rod 96 travels is sealed by a suitable packing gland.

Low pressure air from a suitable source of supply is admitted to the sealed end 98 of cylinder 88 through an adjustable reducing valve (not shown) and the line 99 so that the air pressure upon the low pressure side of the piston 95 will tend to urge the carriage arm 86 and carriage 80 in the direction of revolution of the table 15. The low pressure side of the piston is constantly subjected to the low pressure air admitted through the line 99 and the force of the low pressure air on the piston 95 is set so that it substantially balances the weight and frictional resistance of the carriage 80. Thus, the load of the carriage upon the dogs 89 is reduced to a mere guiding load.

The high pressure line 100 connected to the cylinder 88 adjacent the head 94 is opened to the atmosphere through the carriage return high pressure air bleeder valve 101 while the carriage 80 is driven in the direction of revolution of the table 15. As soon as the trigger 90 is tripped, however, the valve 101 is opened to admit high pressure air to the head of the cylinder 88. The force of the high pressure air on the high pressure side of the piston 95 is not only sufficient to cause a quick return of the carriage to its initial or starting position in time to engage the next succeeding dog 89 but is also sufficient to overcome the force of the low pressure air on the low pressure side of the piston 95. When the carriage 80 is substantially returned to its starting position, the valve 101 shuts off the supply of high pressure air and again bleeds the line 100 to the atmosphere. By regulating the pressure of the high pressure air and by adjusting the timing of the high pressure valve 101, the return of the carriage 80 may be so timed that it will come to rest at its starting point just as a succeeding dog 89 engages the trigger 90.

Carriage return valve and operating means

Figure 4:
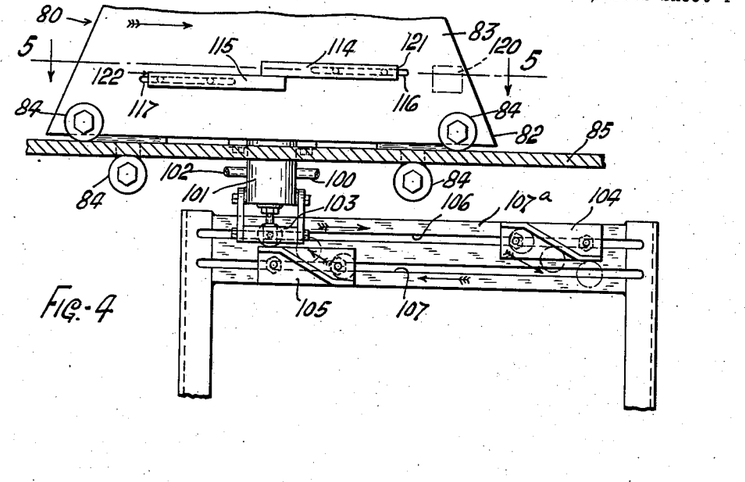
Fig. 4 is an enlarged fragmentary detail taken along the line 4—4 of Figs. 1 and 5.

The carriage return valve 101 is a two-way bleeder valve and, as shown in Figs. 2 and 4, is mounted on the carriage 80. When the line 102 from a suitable source of supply is closed by the valve 101, the line 100 connected to the cylinder 88 is "bled" to the atmosphere. The valve 101 is operated by a horizontal extending handle 103 which, in turn, is operated by the carriage return valve "on" cam 104 and carriage return valve "off" cam 105 adjustably supported in the slots 106 and 107, respectively, of the fixed cam plate 107a.

As shown in Fig. 4, the carriage 80 is at its starting position and the valve 101 is closed. As the carriage 80 approaches the limit of its forward motion in synchronism with the table 15, the carriage return valve handle 103 is engaged by the cam 104, and the valve 101 is opened by the depressing action of the cam 104 on the handle 103 substantially simultaneously with the tripping of the trigger 90. As indicated by the dotted line positions of the valve handle 103, the inertia of the carriage 80, the pressure of the dog 89 during the tripping of the trigger 90, and the effect of the low pressure air in the cylinder 88 may cause the carriage to ride forwardly a slight distance after the valve 101 has been opened. The high pressure air in the cylinder 88, however, quickly returns the carriage until the valve 101 is closed by the lifting action of the cam 105 on the valve handle 103. The considerable inertia of the quick return of the carriage 80 is braked by the low pressure air in the cylinder 88 so that the carriage 80 comes to rest quickly but smoothly at its initial position shortly after the valve 101 is closed. The return of the carriage 80 to its initial position may be timed to coincide with the arrival of the next adjacent dog 89 at the initial carriage position by regulating the maximum pressure of the high pressure air in the line 102 and by adjusting the position of the cam 105 in the slot 107.

Operation of the carriage drive

The operation of the carriage drive may be summarized as follows: With the carriage 80 at its initial position, the trigger 90 is engaged by a dog 89 on the table 15. With the weight and frictional resistance of the carriage balanced by the low pressure air in the cylinder 88, the carriage is displaced in synchronism with an aligned spindle 25 on the table 15 until the trigger 90 is tripped by the cam 92, the air on the high pressure side of the piston 95 in the cylinder 88 being bled out at atmospheric pressure through the carriage return valve 101. Substantially simultaneously with the tripping of the trigger 90, the carriage return valve is opened by the cam 104 and the carriage is quickly returned toward its initial position. As the carriage approaches the initial position, the carriage valve return valve is closed by the cam 105 and the inertia of the carriage is braked by the low pressure air which always acts upon the low pressure side of the piston 95 so that the carriage 80 comes to rest quickly but smoothly at its initial position simultaneously with the arrival of the next succeeding dog 89 at that position, whereupon the cycle is repeated.

Spray gun valve control and operation

To band the rim of ware conveyed on the form 50 by the spindles 25, the center of which ware is engaged by the mask 55 carried by the counter-spindles 40, the banding glaze or coloring material is sprayed from the gun 76 upon the rim of the ware in a thin flat spray so that as the ware is rotated by the engagement of the V-belt 65 with the spindle pulley 29 a plurality of thin and, preferably, substantially dry coats of banding color are applied to the ware, and the coloring material will not run after it is applied. In the machine disclosed in Figs. 1 to 7, the table 15 is revolved in a counter-clockwise direction and the ware is rotated in a clockwise direction. In order to prevent the banding material from being forced under the facing 57 of the mask 55 by the spray gun 76, the gun 76 is directed to a locus on the rim of the ware so that the banding material is applied to the ware in the same direction as that portion of the ware is being rotated. In the particular machine disclosed, as shown in Fig. 1, the glaze is applied along a line located radially inwardly of the spindle supporting the ware and behind the spindle in respect to the direction of revolution of the spindle.

In order to insure that the banding material is applied to the ware only at the desired locus, banding material is sprayed by the gun 76 only during the interval in which the gun carriage moves in alignment and in synchronism with a spindle 25. Also, in order to regulate the thickness of the coat of banding material applied and to conserve the banding material, it may also be desirable to operate the spray gun 76 during an accurately timed interval in the period in which the gun carriage moves in synchronism with the spindle carrying the ware. The mechanism for timing the intermittent operation of the spray gun 76 is as follows: Banding material is supplied under pressure to the gun 76 through the line 108 and atomizing air is supplied through the line 109. Operating air which opens a valve within the gun and permits banding material to be sprayed therefrom by the atomizing air is supplied through the line 110. Thus, by timing the supply of operating air to the gun 76 by the valve 111 which connects the line 110 with a supply line 112, the operation of the spray gun is controlled. The valve 111 is a spring closed two-way bleeder valve adapted to bleed the line 110 when the valve is closed. The valve 111 is fixed to the frame 10 at a point which lies substantially midway in the angle of oscillation of the carriage 80. The valve 111 is operated by a lever 113 secured to the valve stem, the lever 113 being operated by an "on" cam 114 and "off" cam 115 adjustably secured in the slots 116 and 117, respectively, in the gun valve cam plate 83 of the carriage 80. Since the valve 111 is normally spring closed and is opened only while the carriage is moved forwardly in synchronism with a spindle 25, in order to prevent the valve operating cams and levers from being jammed by the quick return of the carriage 80, arcuate lost motion slots 118 are provided in the forked end of the lever 113 to carry a cam roller 120 normally urged forwardly in the slot 118 by the spring 119.

Figure 5:
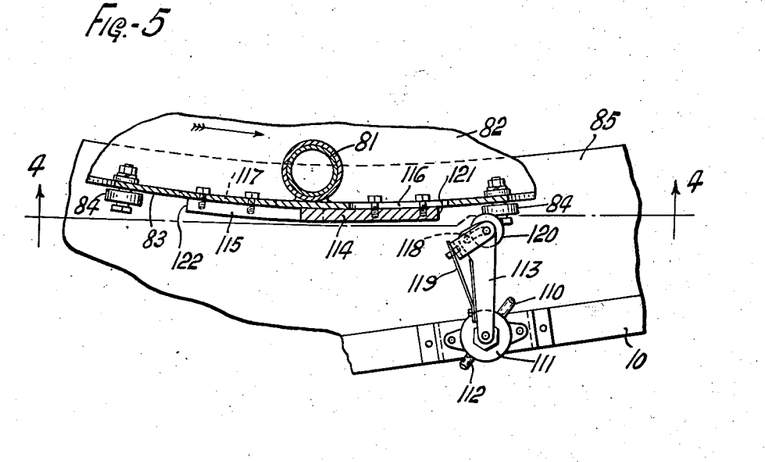
Fig. 5 is an enlarged detail section taken along the line 5—5 of Fig. 4.
Figure 6:
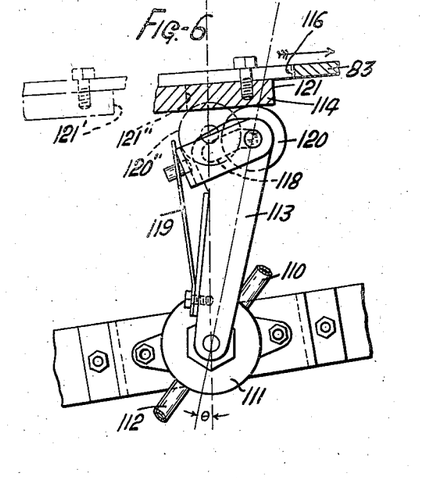
Fig. 6 is an enlarged fragmentary detail view illustrating the actuation of the gun carriage control valve shown in Fig. 5 during advancing movement of the gun carriage.
Figure 7:
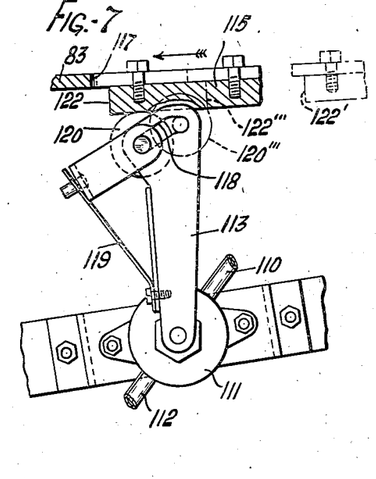
Fig. 7 is an enlarged fragmentary detail view illustrating the actuation of the gun carriage control valve shown in Fig. 5 during return movement of the gun carriage.

The operation of the gun valve 111 by the cams 114 and 115 is shown in Figs. 4 to 7. As shown in Figs. 4 and 5 and as indicated in dotted lines in Fig. 6, when the carriage 80 is in its initial position, the valve lever 113 is in its closed position and the forward edge 121 (indicated as 121' in dotted lines in Fig. 6) of the "on" cam 114 is displaced to the rear of the cam roller 120. As the carriage 80 moves forward in synchronism with a spindle 25, the "on" cam 114 is carried forward until the forward cam edge 121 engages the cam roller 120 (the position of the forward "on" cam edge 121 and the cam roller 120 are indicated in dotted lines in Fig. 6 as 121'' and 120'', respectively). Since the cam roller 120, at the instant of contact with the forward "on" cam edge 121, is at its maximum forward position in the lost motion slot 118, the continued forward movement of the cam 114 turns the lever 113 through the angle theta, thus opening the valve 111 and causing the gun 76 to operate. As shown in the drawings, the "on" cam 114 and "off" cam 115 overlap so that the valve 111 is held open until the rearward edge 122 of the "off" cam 115 is carried beyond the cam roller 120, at which time the spring closed valve returns the lever 113 to its normal closed position, as shown in Fig. 7. At the time the carriage 80 commences its quick return, the rearward edge 122 (indicated as 122' in dotted lines in Fig. 7) of the "off" cam 115 is normally disposed a distance beyond the roller 120. When the rearward edge 122 engages the roller 120 on the return of the carriage 80 (the position of the rearward "off" cam edge 122 and the roller 120 are indicated in dotted lines in Fig. 7 as 122''' and 120''', respectively), the cam 115 clears the forked valve lever arm by forcing the roller 120 against the action of the spring 119 to the retracted position in the lost motion slot 118, as shown in Fig. 7. The roller 120 remains in the retracted position until the roller is cleared by the forward edge 121 of the "on" cam 114, at which time the roller is returned to its maximum forward position in the lost motion slot 118 by the spring 119 and the mechanism is set for a repetition of the cycle. From the foregoing, it is apparent that the spray gun 76 is operated only while the carriage 80 is moved forward in synchronism with a spindle 25, and that the duration of the interval in which the spray gun 76 is operated may be varied by adjusting the relative positions of the "on" cam 114 and the "off" cam 115 with respect to each other.

*Banding operation*

The operation of the several elements of the machine made according to this invention, as shown in Figs. 1 to 7, for banding ceramic ware have been explained at length in conjunction with the description of the elements. The complete banding operation may be briefly summarized as follows: As the table 15 is revolved, ware is placed upon the forms 50 carried by the spindles 25 at a suitable loading and unloading platform. The spindle shafts are then elevated by the cam track 60 as the spindles enter the booth 70. When the ware has been carried into the booth 70, the masks 55 have been centered upon the ware and the counter-spindle 40 floats in the counter-spindle bearing 31. The spindle, ware, mask and counter-spindle are then rotated at a high rate of speed by the V-belt 65 which engages the spindle pulleys 29. Due to the fact that the counter-spindle 40 floats with the spindle bearing 31, the mask 55 is not vibrated or jarred as the ware and the mask 55 resting thereon are rotated at a high rate of speed.

As each spindle 25 arrives at a given point in the booth referred to as the initial point of oscillation of the carriage 80, a dog 89 on the table rim 16 adjacent the spindle engages the trigger wheel 91 of the pivotable trigger 90 on the carriage 80, the carriage 80 having come to rest substantially simultaneously with the engagement of the trigger wheel 91 by the dog 89. With the weight and frictional resistance of the carriage 80 balanced by the low pressure air in the cylinder 88 acting upon the piston 95, the carriage 80 moves in synchronism with a rotating spindle 25 without imposing a jarring load upon the revolving table 15.

Shortly after the carriage 80 has begun to move in synchronism with a revolving spindle 25, the spray gun valve 111, actuated by the "on" cam 114, causes the spray gun 76 mounted on the post 81 of the carriage 80 to direct a thin flat spray of banding material upon the rim of the ware carried by the rotating spindle 25, so that a plurality of thin substantially dry coats of banding material are applied to the ware. Because the carriage carrying the gun 76 moves in synchronism with the spindle 25, the banding material is applied on the ware at a predetermined locus on the rim so that the banding material will not be forced under the facing 57 of the mask 55. After a predetermined interval, depending upon the thickness of the coat of banding material desired to be applied and while the carriage 80 is still moving in synchronism with the spindle 25, the operation of the spray gun 76 is stopped due to the releasing and closing of the valve 111 by the "off" cam 115.

After the carriage 80 has been moved in synchronism with one spindle 25 through an angle less than the angle between the one spindle 25 and the next succeeding spindle, the trigger 90 is tripped over the dog 89 by the fixed trigger trip cam 93 and by the smooth and positive tripping action of the dog 89 on the trigger wheel 91. Substantially simultaneously with the tripping of the trigger 90, the carriage return valve 101 carried by the carriage 80 is opened by the carriage return valve "on" cam 104 to admit high pressure air to the cylinder 88. The high pressure air acting upon the piston 95 quickly returns the carriage 80 toward its initial position. Prior to the return of the carriage 80 to its initial position, the carriage return valve "off" cam closes the carriage return valve 101 which carries the high pressure air to be bled from the cylinder 88. The inertia of the quickly returning carriage 80 is braked by the low pressure air which is constantly acting upon the piston 95, so that the carriage 80 comes to rest at its initial position substantially simultaneously with the arrival of the next succeeding dog 89 at the initial position. Whereupon the cycle of oscillation of the carriage 80 and timed operation of the spray gun 76 is repeated.

After the trigger 90 has been tripped over a dog 89, the pulley 29 of the adjacent spindle is revolved out of engagement with the V-belt 65 and out of the spray booth 70. The cam track 60, however, maintains the ware on the spindle 25 in engagement with the mask 55 and floating counter-spindle 40 until rotation of the spindle shaft substantially ceases. The spindle shaft 28, form 50 and ware is lowered out of engagement with the mask 55 and the banded ware is removed at the unloading station. As the ware is lowered from the mask 55, the tapered journals of the counter-spindle 40 engage the tapered bores of the collars in the counter-spindle bearing 31, so that the mask 55 will again be substantially centered upon the ware carried on the form 50 in the succeeding revolutions of the table 15.

Because of the floating action of the counter-spindle 40, the smooth and vibrationless drive of the carriage 80 substantially independently of the table 15, the actuation of the spray gun 76 only during the period when the carriage 80 moves in synchronism with a spindle 25, and lowering the ware from the mask 55 after rotation of the spindles has substantially ceased, the banding of the ware is sharp and unsmeared, and superior to banding obtained heretofore. Once the machine is set in operation, the operation is substantially fully automatic, the loading and unloading of the ware and occasional removal of excess glaze from the masks 55 being the only manual operations required.

*Glazing set-up and operation*

Figure 8:
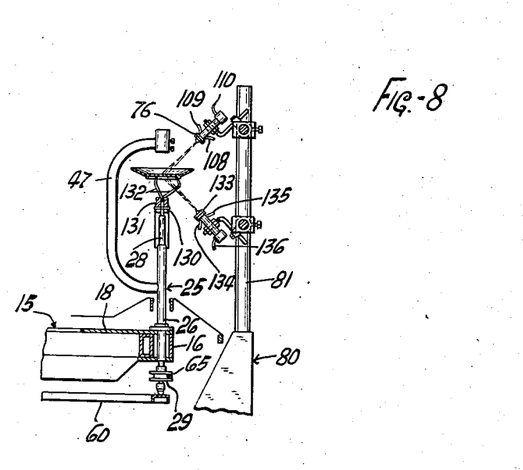
Fig. 8 is a fragmentary detail elevation, partly in section, of the spindle and gun carriage shown in Fig. 2 set up for glazing operations.

To set up a universal ceramic machine made according to this invention for glazing operations, a pronged ware supporting means 130 comprising, as shown in Fig. 8, a hub 131 carrying three or more upstanding prongs 132 is substituted for the hub 51 and form 50 used for the banding operations. Because the counter-spindle is unnecessary in glazing, the counter-spindle bearing 31 may be removed from the counter-spindle housing 30. In glazing operations, it is desired to coat all surfaces of the ware with glaze. The gun 76 is supplied with a liquid glaze through the line 108, atomizing air through the line 109, and operating air through the line 110, as in the banding operation. The gun 76, however, is directed toward the center of the ware and the thin, flat spray issuing therefrom should be wide enough to extend at least from the center to the rim of the ware. With the gun 76 directed toward the upper surface of the ware, an auxiliary spray gun 133, similar to the gun 76 and similarly supported on the post 81, is directed toward the under surface of the ware. The gun 133 is supplied with glaze, atomizing air and operating air through the lines, 134, 135, and 136, which are branch lines of the lines 108, 109, and 110, respectively.

With the exception of the foregoing substitutions of accessories, the set up of this machine for glazing operations is similar to that used for banding operations, and except as the operation is modified by the set up, the operation of the machine for glazing is identical with the banding operation. Ware is placed upon the pronged supports 130 at a suitably located loading station. As the spindles 25 are revolved toward the spray booth 70, the spindle shafts 28 are elevated by the cam track 60. As the spindles are carried into the spray booth, the V-belt 65 engages the pulleys 29, thus rotating the ware. As each spindle arrives at the initial point of the carriage oscillation, the carriage 80 moves in synchronism with the aligned spindle 25. After the carriage 80 has commenced to move in synchronism with the spindle 25, the spray guns 76 and 133 apply a plurality of thin, substantially dry coats of glaze to all surfaces of the ware and are operated for a predetermined timed interval, depending upon the thickness of the glaze coat desired. Since the force of the sprays from the guns 76 and 133 is comparatively light and since the sprays substantially balance each other, the ware is not disturbed upon the supports 130 during the glaze spraying operation. The carriage 80 is then quickly returned for a synchronous oscillation with the next succeeding spindle while the spindle carrying the freshly glazed ware is revolved out of engagement with the V-belt 65 and out of the booth 70. After the rotation of the spindles has substantially ceased, the spindle shafts 28 are lowered and the glaze coated ware is removed from the supporting means 130 at a suitably located unloading station.

*Set-up for sand-blasting*

Figure 9:
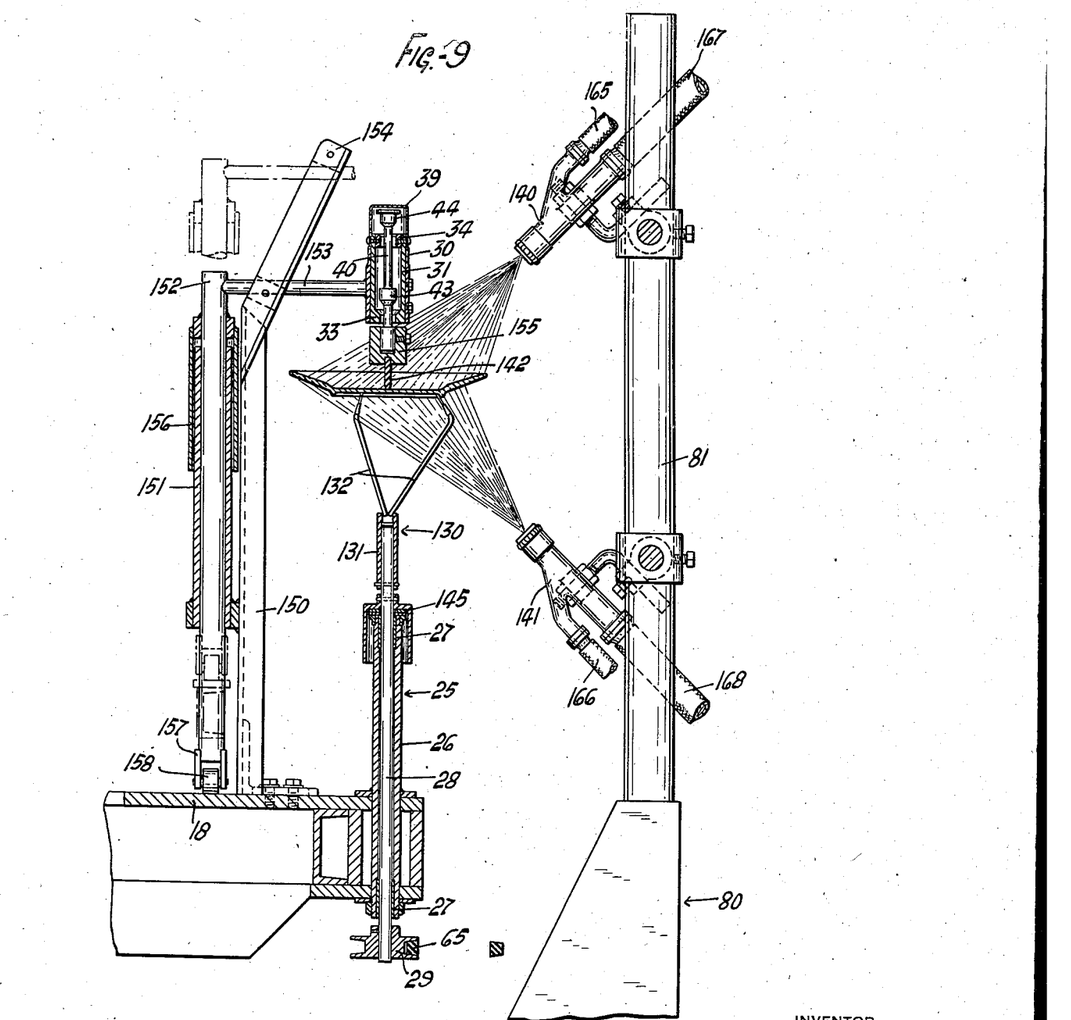
Fig. 9 is an enlarged detail elevation, partly in section, similar to Fig. 8, but showing a modified form of spindle and counter-spindle and showing the gun carriage set up for sand blasting.
Figure 11:
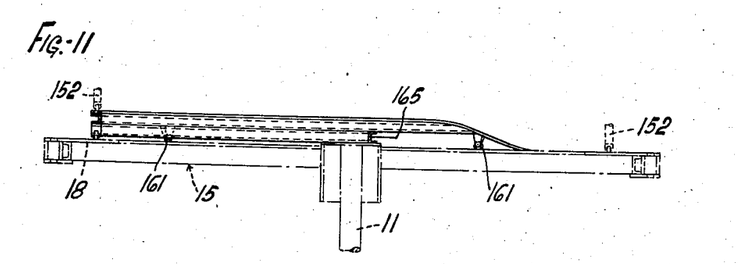
Fig. 11 is a section in elevation taken along the line 11—11 of Fig. 10.

After the ware has been fired in a bisque kiln, it is necessary to clean the bisque prior to glazing. Such cleaning operations are preferably performed by sand-blasting the ware. By substituting the sand-blast guns 140 and 141, as shown in Fig. 9, for the glaze spraying guns 76 and 133 in the set-up for the glazing operations illustrated in Fig. 8, and by substituting the ware finger 142 for the mask 55 in the banding set-up illustrated in Fig. 3, sand-blasting operations could be conducted on the machine as illustrated in Figs. 1 to 8. It has been found, however, that sand-blasting operations are preferably conducted on a machine employing a modified cam track and counter-spindle support, as shown in Figs. 9 to 11.

In the form of the machine designed primarily for sand-blasting, the spindle shaft 28 is maintained in the elevated position by a thrust bearing 145 secured to the spindle shaft 28 and which bears upon the spindle housing 26. Ware is supported on the spindle 25 by the pronged ware support 130, comprising (as shown in Fig. 8 as well as in Fig. 9) a hub 131 and prongs 132.

In order to support the counter-spindle 40 in axial alignment with the spindle 25, an upstanding bracket 150 is fixed to the table apron 18 and carries a tubular cam rod housing 151 in which the cam rod 152 is slidably mounted. Integral with the top of the cam rod 152, and extending laterally therefrom, is an arm 153 which is slidably received in the arm guides 154 carried by the bracket 150. The counter-spindle housing 30 is welded or otherwise secured to the end of the arm 153. The counter-spindle 40 is supported in the counter-spindle housing in the manner described above. Removably secured to the foot of the counter-spindle by means of the integral weighted socket 155 is the ware finger 142 adapted to engage the center of the ware carried by the pronged ware support 130.

A cam rod sleeve 156 is secured to the cam rod 152 adjacent the top thereof and is adapted to protect that portion of the cam rod which may be extended above the cam rod housing 151. A cam follower comprising a fork 157 and a roller 158 is secured to the bottom of the cam rod 152.

While the spindle 25 is revolved through the booth 70, the cam rod roller 158 rests upon the apron 18, the ware finger 142 engages the ware, and the counter-spindle 40 floats in the counter-spindle bearing 31. In order to disengage the finger 142 from the ware, a cam track 160 is employed.

Figure 10:
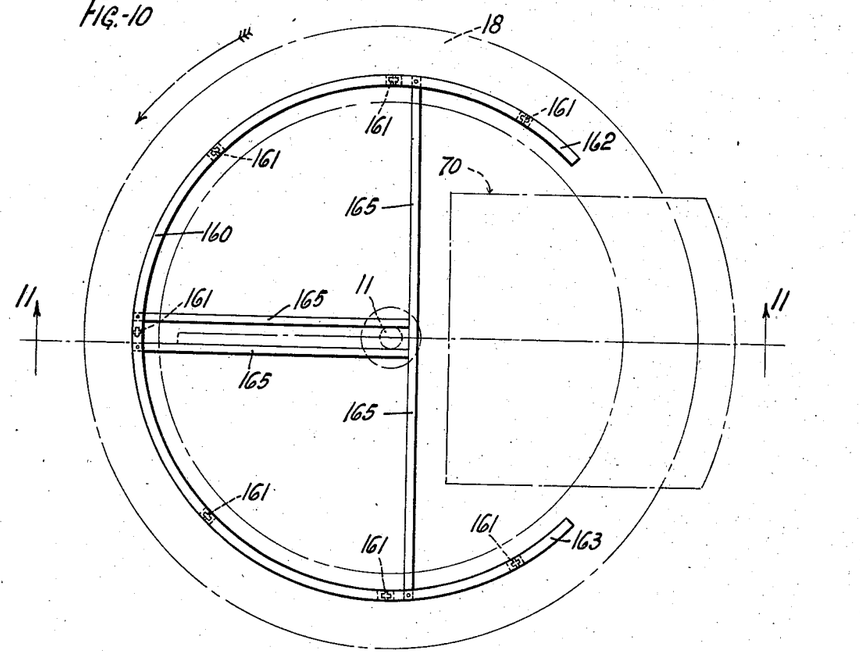
Fig. 10 is a plan view of a counter-spindle cam track for the modified form of counter-spindle shown in Fig. 9.

As shown in Figs. 10 and 11, the cam track 160 is an arcuate track substantially concentric with the inner periphery of the apron 18 and is maintained in an elevated horizontal position thereabove by the plurality of casters 161, which engage the revolving surface of the apron 18. The cam track 160 is provided with sloping ends 162 and 163 which slope downwardly to the apron 18 adjacent the booth 70. The cam track 160 is fixed in its position upon the apron 18 by the radius rods 165 which are secured to the central post 11. As the cam rod 152 is revolved out of the booth 70, the roller 158 engages the sloping end 162 of the cam track and the cam rod 152 is elevated to the cam track 160. (The elevated position of the cam rod 152 is shown in dotted lines in Fig. 9.) When the cam rod is thus raised, the finger 142 is lifted out of engagement with the ware and the counter-spindle 40 is centered in the bearing 31 in the manner described heretofore.

The sand-blast guns 140 and 141 are mounted on the carriage post 81 in the manner described above, the conical blast from the upper gun 140 being directed to scour the entire upper surfaces of the ware and the blast of the lower gun 141 being directed to scour the lower surfaces of the ware. Although the blasts from the upper and lower guns are substantially equal and the vertical components of the force of the blasts are normally balanced, the nozzles of the guns may be temporarily clogged by particles of grit, thus reducing the force of the blasts. If the upper gun 140 becomes clogged, the finger 142 prevents the blast of the lower gun 141 from blowing the ware off the support 130. The finger 142 is also necessary to prevent the unbalanced lateral components of the blasts from blowing the ware off the holders 130. Scouring grit is supplied to the guns 140 and 141 through the lines 165 and 166, respectively; operating air is supplied through the lines 167 and 168, respectively. The guns may be operated intermittently by connecting the lines 167 and 168 to the gun valve 111, or the guns may be operated continuously, if desired, by connecting the lines 167 and 168 directly to the operating air source of supply.

*Sand-blasting operation*

Except insofar as the operation of the machine is modified by the set-up, the operation of the machine is similar to the operation of the machine for banding or glazing as described above. With the counter-spindles 40 elevated above the holders 130 by the action of the cam track 160 on the cam rod 152, ware is placed upon holders 130 at a convenient loading station. As the spindles are revolved toward the booth 70, the cam roller 158 rides down the sloping portion 163 of the cam track to the apron 18, so that the finger 142 engages the ware and the counter-spindle 40 floats in the bearing 31 as the spindles enter the booth 70. Shortly after the spindles 25 are revolved into the booth 70, the V-belt 65 is engaged by the pulleys 29 and the spindle shafts 28, the ware carried thereby, the finger 142, and counter-spindle 40 are all rotated. As each spindle 25 arrives at the initial point of carriage oscillation, the carriage 80 moves in synchronism with the spindle and the ware is scoured by the blasts from the guns 140 and 141. Shortly after the spindle passes beyond the oscillating carriage, the pulleys 29 are revolved out of engagement with the V-belt 65 and the spindles 25 are then revolved out of the booth 70.

The cam roller 158 then engages the sloping end 162 of the cam track 160 causing the finger 142 to be lifted out of engagement with the ware and the counter-spindle 40 to be centered in the bearing 31.

It is apparent from the foregoing that the modification shown in Figs. 9 to 11 differs substantially from the embodiment shown in Figs. 1 to 8 only in regard to the means for obtaining relative axial movement between the spindle shaft 28 and the counter-spindle 40. It is also apparent, therefore, that by substituting the spray gun 76 for the guns 140 and 146, the form 50 for the pronged support 130, and the mask 55 for the finger 142, the modification disclosed in Figs. 9 to 11 may be used for banding ware, and that by substituting the guns 76 and 133 for the guns 140 and 141 and by removing the counter-spindle bearing 31 from the housing 30, the modification disclosed in Figs. 9 to 11 may also be used for glazing ware.

*Set-up for stamping*

In decorating ware, it is often desired to apply a colored design to the upper surface of the ware. Heretofore, such designs have usually been applied by decalcomania or by manually operated stamps. A machine made according to this invention may be readily set for substantially automatic stamping operations.

Figure 12:
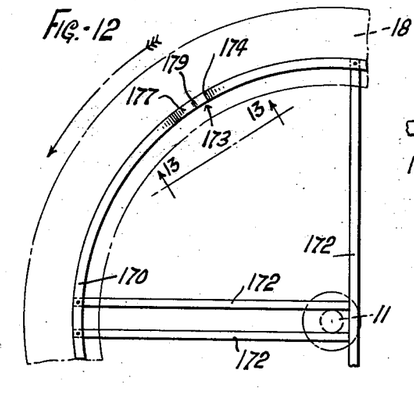
Fig. 12 is a fragmentary plan view of a quadrant of the cam track shown in Fig. 10 modified for stamping operations.
Figure 13:
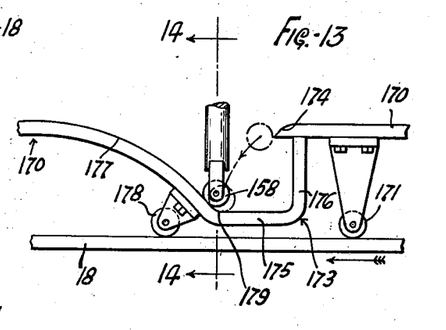
Fig. 13 is a detail elevation taken from the line 13—13 of Fig. 12.
Figure 14:
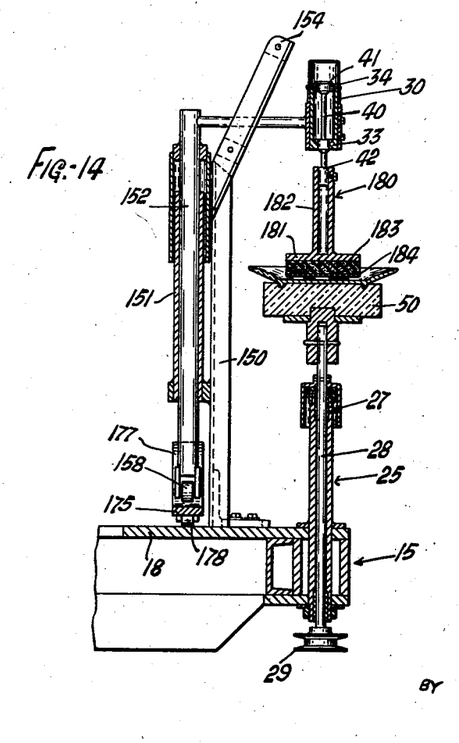
Fig. 14 is a detail section taken along the line 14—14 of Fig. 13 showing the action of a spindle and counter-spindle illustrated in Fig. 9 set up for stamping operations on the counter-spindle cam track illustrated in Figs. 12 and 13.

To set up the modification shown in Figs. 9 to 11 for stamping operations, the cam track 170 is substituted for the cam track 160. The cam track 170 is a circular member substantially concentric with the inner periphery of the table 18 above which the cam track 170 is supported at a suitable elevation by the casters 171. The cam track 170 is maintained in the selected fixed position by the radius members 172 which are secured to the central post 11. In one quadrant of the cam track 170 (as shown in Figs. 12 to 14), there is provided a drop 173 by which the stamping operations are performed, the remainder of the circular cam track 170 being substantially horizontal.

At the drop 173, the cam track 170 is provided with a protruding horizontal lip 174. Below the lip 174 a short horizontal member 175 is provided, the horizontal member 175 being supported a short distance above the revolving table 18 by a vertical member 176 connected to the elevated cam track 170 adjacent the lip 174 and by a steep lifting cam portion 177 connected to the cam track 170 beyond the lip 174. The lifting cam 176 is supported by a short caster 178 adjacent its point of juncture 179 with the horizontal member 175. The vertical distance between the edge of the lip 174 and the horizontal member 175 is such that a stamp 180, secured to a counter-spindle 40 supported by a cam rod 152, will be dropped upon the ware with sufficient force to stamp a design satisfactorily. The horizontal distance between the edge of the lip 174 and the point of juncture 179 is such that a cam roller 158, being revolved over the track 170 at the optimum rate of revolution, will strike the point of juncture 179 after falling off the lip 174.

The stamp 180 comprises a base 181 which is removably secured to the foot 42 of the counter-spindle 40 by means of a central socket 182. Secured to the base 181 is a pad 183, preferably of sponge rubber or the like. The pad 183 supports the plate 184, usually of sheet rubber or the like, upon which the design to be printed is embossed. As explained fully in connection with the description of the modification illustrated in Figs. 9 to 11, the counter-spindle 40 is axially aligned with spindle 25, the counter-spindle housing 30 being supported by the cam rod 152 slidably mounted in the cam rod housing 151; the cam rod housing 151 is carried by the bracket 150 fixed to the apron 18; a cam roller 158 is fixed to the lower end of the cam rod 152. Ware to be stamped is supported by the grooved form 50 mounted on the spindle shaft 28.

*Stamping operation*

To perform the stamping operation, the table 15 carrying the several spindles 25 and the counter-spindle supports 150 is revolved at an optimum rate of revolution in the usual manner. Although the cam track 170 extends through the booth 70 and the spindles 25 are revolved therethrough, the carriage is disconnected and rendered inoperative by shutting off the air to the cylinder 88 and by securing the trigger 90 in a tripped position.

As the cam rod 152 rides on the cam track 170, the counter-spindle 40 is centered in its bearing 31, and the stamp 180 is lifted clear of the ware supporting form 50. At a suitable inking station, pigment is applied to the plate 183. This may be done by causing the plate 183 to wipe a conventional inking roll. Ware is then placed on the form 50 at a loading station and revolved toward the drop 173. When the cam roller 158 rolls over the lip 173, the cam rod 152 falls vertically within the housing 151 and at the same time is displaced horizontally as the table 15 continues to rotate. Thus, the cam roller 158 strikes the point of juncture 179. The cam rod 152 is then lifted immediately by the action of the lifting cam on the roller 158. Substantially simultaneously with the striking of the point of juncture 179 by the roller 158, the stamp 180 falls on the ware supported by the form 50 and the plate 184 prints the design on the ware. Due to the resilience of the pad 183, the stamp 180 and the counter-spindle 40 then bounce vertically away from the ware. The counter-spindle 40 floats within its bearing 31 during the instant the stamp 180 bounces, but before the stamp 180 falls back upon the ware the counter-spindle 40 is caught and maintained in its disengaged position by the rapidly rising counter-spindle bearing 31 carried by the ascending cam rod 152. Fig. 14 shows the relative location of the ware, stamp 180, counter-spindle 40, cam rod roller 158, and lifting cam 177 at the instant the counter-spindle 40 is caught by the rapidly rising counter-spindle bearing 31. By means of the stamping operation thus described, a single clear and sharp impression of the design is obtained on the ware. After the lifting cam 177 has returned the cam roller 158 to the cam track 170, the counter-spindle 40 is again centered in its bearing 31, and the stamp 180 is supported clear of the ware. The ware may then be removed at a suitable unloading station, and the cycle is then repeated.

Although stamping operations are preferably performed on a machine employing the counter-spindle support of the modification illustrated in Figs. 9 to 11, such stamping operations are not restricted to that form of this invention. By substituting the stamp 180 for the mask 55, disconnecting the carriage 80, and placing a sharp hump on the cam track 60, stamping operations may be carried out on the embodiment shown in Figs. 1 to 7 by loading the ware beyond the booth 70, stamping the ware, and removing the ware before the spindles 25 re-enter the booth 70.

From the foregoing description of the preferred embodiment shown in Figs. 1 to 8 for banding and glazing operations and the description of the preferred modification shown in Figs. 9 to 14 for sand-blasting and stamping operations, it is obvious that this invention is not limited to the specific embodiments disclosed but may be changed and modified within the scope of the appended claims.

What is claimed is:

1. In a machine for treating ceramic ware, a revolvable table, a variable drive for revolving said table, a plurality of spindles mounted on said table adjacent the periphery thereof, a counter-spindle bearing axially aligned with each of said spindles and carried by said table, a counter-spindle movable axially with respect to said spindle, means limiting the movement of said counter-spindle toward said spindle and supporting said counter-spindle in alignment with said spindle and by said bearing, said means permitting said counter-spindle to float with respect to said bearing when said counter-spindle is displaced from its bearing supported position, ware supporting means mounted on said spindles, ware engaging means secured to each of said counter-spindles, means causing said ware engaging means to engage ware carried by said ware supporting means by moving said spindle and counter-spindle axially toward each other until said counter-spindle is displaced from its bearing supported position, whereby said counter-spindle is free to float within said counter-spindle bearing while said ware engaging means engage the ware, and means for treating the ware while said ware engaging means engages the ware.

2. In a ceramic machine of the class described, a ware supporting spindle, a ware support mounted on said spindle, a counter-spindle bearing axially aligned with said spindle, a counter-spindle movable axially with respect to said spindle, means limiting the movement of said counter-spindle toward said spindle and supporting said counter-spindle in alignment with said spindle and by said bearing, said means permitting said counter-spindle to float with respect to said bearing when said counter-spindle is displaced from its bearing supported position, ware engaging means carried by said bearing counter-spindle, and a cam for moving said spindle and counter-spindle axially toward each other until said ware engaging means engage ware carried by said ware support and said counter-spindle is displaced from its bearing supported position, whereby said counter-spindle is free to float within said counter-spindle bearing while said ware engaging means engages ware carried by said ware support.

3. In a machine of the class described, an article supporting spindle, an article support carried by said spindle, counter-spindle members comprising a counter-spindle bearing axially aligned with said article supporting spindle and a counter-spindle shaft carried by said counter-spindle bearing axially movable with respect to said article supporting spindle, an article engaging means removably secured to said counter-spindle, and axially convergent means on one of said counter-spindle members axially aligned with said article supporting spindle, whereby said counter-spindle shaft will float in said bearing while said article engaging means is in engagement with an article carried by said article support and said convergent means will center said counter-spindle shaft in said bearing when said article engaging means is out of engagement.

4. In a machine of the class described, a counter-spindle bearing having an enlarged bore, a collar within said bearing having a bore less than the bore of said bearing, a counter-spindle having a diameter less than the bore of said collar and axially movable within said bearing, and a journal on said counter-spindle to engage the bore of said collar and to center said counter-spindle in said bearing.

5. In a machine of the class described, counter-spindle members comprising a counter-spindle bearing, a counter-spindle shaft axially movable within said bearing, and an axially convergent member on one of said counter-spindle members to center said counter-spindle shaft within said bearing when said counter-spindle shaft is moved relatively to said bearing in one direction and to permit said counter-spindle shaft to float in said bearing when said counter-spindle shaft is moved relatively to said bearing in the opposite direction.

6. In a machine of the class described, a revolvable table, means for revolving said table, a rotatable spindle carried by said table, means for rotating said spindle during a portion of the orbit through which said spindle is revolved by said table, a ware support on said spindle, a booth extending over said table through which said table carries said spindles while said spindles are rotated, a spray gun carriage oscillatable about the axis of said table, a pneumatic drive for said carriage, means on said carriage adapted to engage said table and to move said carriage in synchronism with said table while said pneumatic drive drives said carriage in the direction of revolution of said table, a spray gun mounted on said carriage and directed toward ware carried by said ware support during the synchronous movement of said carriage and table, and means for operating said spray gun only during the synchronous movement of said carriage and table.

7. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, a first pneumatic means operatively connected to said carriage and constantly urging said carriage to move in the direction of movement of said conveyor, and a second pneumatic means intermittently forcing said carriage to move oppositely to the direction of movement of said conveyor.

8. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, a first pneumatic means operatively connected to said carriage and constantly urging said carriage to move in the direction of movement of said conveyor, a second pneumatic means intermittently forcing said carriage to move oppositely to the direction of movement of said conveyor, and an intermittently operated valve controlling the operation of said second pneumatic means.

9. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, a first pneumatic means operatively connected to said carriage and constantly urging said carriage to move in the direction of movement of said conveyor, a second pneumatic means intermittently forcing said carriage to move oppositely to the direction of movement of said conveyor, an intermittently operated valve controlling the operation of said second pneumatic means, and a valve cam controlling said intermittently operated valve.

10. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, driving means independent of said conveyor driving means to oscillate said carriage, a spray gun mounted on said carriage, a normally closed spray gun valve, and means for opening said spray gun valve and operating said spray only during the said first phase of oscillation of said carriage.

11. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, a first pneumatic means operatively connected to said carriage and constantly urging said carriage to move in the direction of movement of said conveyor, a second pneumatic means intermittently forcing said carriage to move oppositely to the direction of movement of said conveyor, a spray gun mounted on said carriage, a normally closed spray gun valve, and means for opening said spray gun valve and operating said spray only during the said first phase of oscillation of said carriage.

12. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, a first pneumatic means operatively connected to said carriage and constantly urging said carriage to move in the direction of movement of said conveyor, a second pneumatic means intermittently forcing said carriage to move oppositely to the direction of movement of said conveyor, an intermittently operated valve controlling the operation of said second pneumatic means, a spray gun mounted on said carriage, a normally closed spray gun valve, and means for opening said spray gun valve and operating said spray only during the said first phase of oscillation of said carriage.

13. In a machine of the class described, an article conveyor, means to drive said conveyor in one direction, a carriage oscillatable in the direction of movement of said conveyor during the first phase of its oscillation and opposite to the movement of said conveyor during the second phase of its oscillation, a first pneumatic means operatively connected to said carriage and constantly urging said carriage to move in the direction of movement of said conveyor, a second pneumatic means intermittently forcing said carriage to move oppositely to the direction of movement of said conveyor, an intermittently operated valve controlling the operation of said second pneumatic means, a valve cam controlling said intermittently operated valve, a spray gun mounted on said carriage, a normally closed spray gun valve, and means for opening said spray gun valve and operating said spray only during the said first phase of oscillation of said carriage.

14. In a machine of the class described, a revolvable table, means to revolve said table, a spindle, a counter-spindle axially aligned with said spindle, means for supporting said spindle and said counter-spindle adjacent the periphery of said table and in an axially movable relationship with respect to each other, a ware support carried by said spindle and a ware engaging means carried by said counter-spindle, a cam track to cause said spindle and counter-spindle to move relatively toward each other and to cause said ware engaging means to engage ware carried by said ware support, means for rotating said spindle while ware is engaged by said ware engaging means, a booth extending over said table through which said spindles are revolved while said spindles are rotated, a carriage within said booth oscillatable about the axis of said table, and a pneumatic drive for said carriage to balance the weight and frictional resistance of said carriage while said carriage moves in synchronism with said table from an initial point of oscillation to a point of maximum oscillation and to return said carriage from said point of maximum oscillation to said initial point of oscillation.

15. In a machine of the class described, a frame, a revolvable table supported by said frame, means to revolve said table, a spindle mounted on said table, a counter-spindle bearing axially aligned with said spindle, a cam track fixed relative to said frame and supported by said revolvable table, a cam follower carried by said table and operated by said cam track to move said counter-spindle bearing axially with respect to said spindle, a counter-spindle axially movable within said counter-spindle bearing, a ware engaging means secured to said counter-spindle, a ware support carried by said spindle, said cam follower and said cam track cooperating to move said ware engaging means into engagement with ware carried by said ware support, said counter-spindle being moved axially within said counter-spindle bearing when said ware engaging means engages the ware, and means for treating the ware when said ware is engaged.

16. In a machine of the class described, a frame, a revolvable table supported by said frame, means to revolve said table, a spindle mounted on said table, a counter-spindle bearing axially aligned with said spindle, a fixed cam track on said revolvable table, a cam carried by said table and operated by said cam track to move said counter-spindle bearing axially with respect to said spindle, a counter-spindle axially movable within said counter-spindle bearing.

17. In a machine of the class described, a revolvable table, means to revolve said table, a spindle housing mounted on said table, an axially movable spindle rotatably mounted in said spindle housing, a counter-spindle bearing supported from said spindle housing in axial alignment with said spindle, a counter-spindle axially movable within said counter-spindle bearing, a ware support carried by said spindle, a ware engaging means carried by said counter-spindle, a cam track to engage said spindle and to move ware carried by said ware support into engagement with said ware engaging means, whereby said counter-spindle is moved axially within said counter-spindle bearing, means for rotating said spindle while said ware engaging means engages ware carried by said ware support, a carriage mounted for oscillating movement about the axis of said table, means for driving said carriage in the direction of revolution of said table and in synchronism with said table while said spindles are rotated, a spray gun carried by said carriage, and means for operating said spray gun only while said carriage is driven in synchronism with said table.

18. In a machine of the class described, a revolvable table, means to revolve said table, a spindle housing mounted on said table, an axially movable spindle rotatably mounted in said spindle housing, a counter-spindle bearing supported from said spindle housing in axial alignment with said spindle, a counter-spindle axially movable within said counter-spindle bearing, a ware support carried by said spindle, a ware engaging means carried by said counter-spindle, and a cam track to engage said spindle and to move ware carried by said ware support into engagement with said ware engaging means, whereby said counter-spindle is moved axially within said counter-spindle bearing.

19. In a machine of the class described, a revolvable table, means to revolve said table, a spindle housing mounted on said table, a spindle rotatably mounted in said housing, a counter-spindle bearing, means mounted on said table for supporting said counter-spindle bearing in axially movable alignment with said spindle, a counter-spindle axially movable in said counter-spindle bearing, a ware support carried by said spindle, a ware engaging means secured to said counter-spindle, a fixed cam track to move said counter-spindle bearing axially toward said spindle and to cause ware carried by said ware support to be engaged by said ware engaging means, whereby said counter-spindle is moved axially within said counter-spindle bearing, means to rotate said spindle while said ware is engaged, a pneumatically driven carriage oscillated about the axis of said table adjacent the portion of the orbit of said spindle on said table where said spindle is rotated, and sand-blast means carried by said carriage.

20. In a machine of the class described, a revolvable table, means to revolve said table, a spindle mounted on said table, a counter-spindle bearing means mounted on said table for supporting said counter-spindle bearing in axially movable alignment with said spindle, a counter-spindle axially movable within said counter-spindle bearing, a ware support mounted on said spindle, a ware stamp mounted on said counter-spindle, a fixed cam track to move said counter-spindle bearing axially toward said spindle whereby said stamp engages and stamps ware carried by said ware support and said counter-spindle is moved axially within said counter-spindle bearing.

21. In a machine of the class described, a ware supporting means, a counter-spindle bearing, means for supporting said counter-spindle bearing in axially movable alignment with said ware supporting means, a counter-spindle axially movable in said counter-spindle bearing, a stamp secured to said counter-spindle, and a cam first moving said counter-spindle bearing toward ware carried by said ware support whereby said stamp engages the ware and said counter-spindle moves axially in said bearing, said cam then moving said bearing away from said ware support whereby said stamp produces a single impression on the ware.

H. V. SCHWEITZER.